United States Patent
Kurata et al.

(10) Patent No.: US 7,043,928 B2
(45) Date of Patent: May 16, 2006

(54) REFRIGERATION CYCLE SYSTEM

(75) Inventors: Shun Kurata, Kariya (JP); Yoshiaki Takano, Kosai (JP); Satoshi Izawa, Anjo (JP)

(73) Assignee: Denso Corporation, Kariya (JP)

( * ) Notice: Subject to any disclaimer, the term of this patent is extended or adjusted under 35 U.S.C. 154(b) by 292 days.

(21) Appl. No.: 10/785,752

(22) Filed: Feb. 23, 2004

(65) Prior Publication Data

US 2004/0177628 A1  Sep. 16, 2004

(30) Foreign Application Priority Data

Feb. 24, 2003 (JP) ............................. 2003-045981

(51) Int. Cl.
  F25B 41/00 (2006.01)
  F25B 49/00 (2006.01)
  F25B 13/00 (2006.01)
(52) U.S. Cl. .................. 62/160; 62/196.4; 62/197; 62/324.1
(58) Field of Classification Search ............... 62/160, 62/197, 196.4, 324.1, 159, 149, 228.3; 165/62, 165/43
See application file for complete search history.

(56) References Cited

U.S. PATENT DOCUMENTS 5,291,941 A * 3/1994 Enomoto et al. ............. 165/62
6,058,728 A * 5/2000 Takano et al. ............. 62/196.4
6,105,375 A   8/2000 Takano et al.
6,526,771 B1 * 3/2003 Takano et al. ............. 62/228.3

FOREIGN PATENT DOCUMENTS

JP   2000-219033   8/2000

* cited by examiner

*Primary Examiner*—Chen Wen Jiang
(74) *Attorney, Agent, or Firm*—Harness, Dickey & Pierce, PLC

(57) ABSTRACT

A refrigeration cycle system is disclosed. Upon generation of a start signal for a hot gas heater cycle, the cooling mode is first started thereby to start the dormant refrigerant recovery mode (S10) and, upon an increase in the compressor discharge pressure Pd to a predetermined setting P1, the cooling mode is ended and the compressor is switched to the off mode (S20, S30). Upon the lapse of a predetermined time ta in the off mode, the off mode is ended (S40) and the heating mode with the hot gas heater cycle is started.

10 Claims, 8 Drawing Sheets

REFRIGERATION CYCLE SYSTEM

BACKGROUND OF THE INVENTION

1. Field of the Invention

The present invention relates to a refrigeration cycle system having the function of a hot gas heater using a first heat exchanger (evaporator) as a gas refrigerant heat radiator by introducing the refrigerant gas (hot gas) discharged from a compressor directly into the first heat exchanger in heating mode, or in particular to a refrigeration cycle system suitably used with, for example, an automotive air-conditioning system for controlling the refrigerant recovery mode to recover the refrigerant (including oil) staying dormant in a second heat exchanger (condenser) into the first heat exchanger.

2. Description of the Related Art

In the conventional automotive air-conditioning system, hot water (engine cooling water) is circulated in a heating heat exchanger during the winter season, so that the air-conditioning air is heated by the heating heat exchanger with the hot water as a heat source. In the case where the hot water is low in temperature, however, the temperature of the air blown into the compartment is so low that the required heating ability may sometimes not be secured.

In view of this, a refrigeration cycle system capable of exhibiting the heating function using a hot gas heater cycle has been proposed. In this conventional system, in the case where the hot water temperature is lower than a predetermined temperature as at the time of starting the engine, the gas refrigerant discharged from the compressor (hot gas) is introduced directly into the first heat exchanger bypassing the second heat exchanger, so that heat is radiated from the gas refrigerant into the air-conditioning air in the first heat exchanger to exhibit the heating function.

In the automotive refrigeration cycle system, both the second heat exchanger and the compressor are mounted in the engine compartment, or the like, outside the passenger compartment. Once the refrigeration cycle is stopped in winter, for example, the temperature of the second heat exchanger drops to as low as the external air temperature and assumes the lowest temperature in the refrigeration cycle. Thus, the refrigerant saturation pressure of the second heat exchanger assumes the lowest pressure of the refrigeration cycle, thereby posing the problem that the refrigerant enters a dormant state in the second heat exchanger during the winter season when the refrigeration cycle is suspended.

Even after starting the hot gas heater cycle, the refrigerant circulates bypassing the second heat exchanger, and therefore the dormant state of the refrigerant in the second heat exchanger is maintained also after the hot gas heater cycle starts. As a result, during the execution of the hot gas heater cycle, the refrigerant amount in the hot gas heater cycle runs short for a reduced heating performance, thereby inconveniently hampering the smooth return of oil to the compressor.

Japanese Unexamined Patent Publication No. 2000-219033 discloses a system in which the cooling mode is started before the hot gas heater cycle thereby to start the mode of recovering the dormant refrigerant, and upon lapse of a predetermined time, the cooling mode is ended and switched to the heating mode with the hot gas heater cycle.

The same publication also proposes another example of the mode of recovering the dormant refrigerant, in which both the inlet side of the second heat exchanger and the inlet side of the hot gas bypass of the hot gas heater cycle are closed, and the compressor is activated to recover the dormant refrigerant in the second heat exchanger.

In the refrigerant cycle system for automotive vehicles, a variable displacement type refrigerant compressor of swash plate type is used to reduce the drive power of the compressor by reducing the discharge capacity of the compressor under low cooling load. In the variable displacement type refrigerant compressor of a swash plate type, the swash plate chamber accommodating the swash plate communicates with the discharge side and the suction side of the compressor, and the pressure of the swash plate chamber (control pressure) is controlled by a pressure control valve utilizing the difference between discharge pressure and suction pressure. By controlling the pressure of the swash plate chamber, the inclination angle of the swash plate is changed thereby to change the piston stroke and hence the discharge capacity.

In the case where the refrigeration cycle is stopped when the temperature is very low and the hot gas heater cycle is required, for example, when the external air temperature is as low as $-20°$ C. to $-30°$ C., however, the compressor is exposed to the external low temperature environment and its temperature is reduced to as low as the external air temperature. As a result, a great amount of the refrigerant in liquid phase stays in the swash plate chamber of the compressor. Thus, the agitation resistance of the liquid refrigerant greatly increases against the swash plate at the next time of starting the compressor. At the same time, the liquid refrigerant in the swash plate chamber is evaporated to prevent the pressure in the swash plate chamber from being decreased, thereby leading to the unfavorable situation in which the inclination angle of the swash plate cannot be changed rapidly to the large capacity side.

As a result, the compressor cannot be rapidly increased to large discharge capacity. The compressor, if it starts, therefore, operates with a smaller capacity (small piston stroke) for a prolonged time during which the refrigerant is not discharged substantially. During this time, the dormant refrigerant in the second heat exchanger substantially cannot be recovered.

Also, as long as the external temperature remains very low, the refrigerant sealed in the cycle is liquefied and the saturation pressure becomes very low. Thus, the density of the suction refrigerant is very low at the time of starting the compressor. This leads to be the suction refrigerant thin in the compressor and to reduce a flow rate (mass flow rate) of the suction refrigerant, and the discharge pressure of the compressor is not easily increased. As a result, the difference between the discharge pressure and the suction pressure is not readily increased. Even in the case where the liquid refrigerant is not stagnant in the swash plate chamber at the time of starting the compressor, therefore, the inclination angle of the swash plate cannot be rapidly changed to the large capacity side. Thus, even in the case where the compressor is started in a cooling mode, the dormant refrigerant substantially cannot be recovered as in the case described above.

In the prior art disclosed in Japanese Unexamined Patent Publication No. 2000-219033, the mode of recovering the dormant refrigerant is terminated upon the lapse of a predetermined time after starting the recovery mode. In the case where the time set for recovery mode is short as compared with the time when the compressor operates with small capacity after starting, therefore, the dormant refrigerant substantially cannot be recovered even if the recovery mode is executed.

In the case where the recovery mode is set to an excessively long time as compared with the time during which the compressor operates with small capacity, on the other hand, the recovery mode is continued even after the successful recovery of the dormant refrigerant, thereby making it impossible to exhibit the timely heating function due to the hot gas heater cycle.

SUMMARY OF THE INVENTION

The present invention has been developed in view of the points described above, and an object of the invention is to provide a refrigeration cycle system comprising a first heat exchanger (evaporator) adapted to operate as a heat radiator for switching the heating mode due to the hot gas heater cycle and the cooling mode, and a variable displacement type refrigerant compressor for changing the discharge capacity utilizing the difference between discharge pressure and suction pressure, wherein the mode of recovering the refrigerant dormant in the second heat exchanger (condenser) is accurately carried out.

In order to achieve the object described above, according to one aspect of the invention, there is provided a refrigeration cycle system in which, upon generation of a start signal for the hot gas heater cycle (H), the cooling mode is started first to start the mode of recovering the dormant refrigerant in a second heat exchanger (14), and after executing the dormant refrigerant recovery mode, the heating mode with the hot gas heater cycle (H) is executed, wherein the compressor is a variable displacement type refrigerant compressor (10) having a variable displacement mechanism (100) for changing the discharge capacity utilizing the difference between discharge pressure and suction pressure, and wherein after starting the dormant refrigerant recovery in cooling mode, the time of ending the cooling mode is determined based on the information value correlated with the discharge pressure of the compressor (10).

In this aspect of the invention, the cooling mode can be finished after confirming that the discharge pressure of the compressor (10) has actually increased to such an extent that the dormant refrigerant can be recovered in the second heat exchanger (14). Before executing the heating mode with the hot gas heater cycle (H), therefore, the refrigerant can be positively recovered from the second heat exchanger (14) to the first heat exchanger (18).

As a result, the hot gas heater cycle (H) can be started with an original proper amount of the refrigerant, so that the heating performance with the hot gas heater cycle (H) can be satisfactorily exhibited while at the same time securing a high ability of oil to return to the compressor (10).

Also, as the cooling mode is finished after confirming that the dormant refrigerant can be recovered, the heating mode with the hot gas heater cycle (H) can be started at appropriate timing after recovering the dormant refrigerant.

Specifically, in this aspect of the invention, the cooling mode for refrigerant recovery is terminated once the discharge pressure of the compressor (10) rises to a predetermined level.

Also, specifically, in this aspect of the invention, the cooling mode for refrigerant recovery may alternatively be finished once the discharge pressure of the compressor (10) increases by a predetermined amount after starting the cooling mode.

According to another aspect of the invention, there is provided a refrigeration cycle system, wherein the dormant refrigerant recovery mode for the second heat exchanger (14) is started by starting the cooling mode upon generation of a start signal for the hot gas heater cycle (H) and, after recovering the dormant refrigerant, the heating mode with the hot gas heater cycle (H) is executed, wherein the compressor is a variable displacement type refrigerant compressor (10) having a variable displacement mechanism (100) for changing the discharge capacity utilizing the difference between the discharge pressure and the suction pressure, and wherein from the time point when the discharge pressure of the compressor (10) rises by a predetermined amount after starting the dormant refrigerant recovery in cooling mode, the time begins to be counted, and upon the lapse of a predetermined time, the cooling mode is finished.

The variable displacement type refrigerant compressor (10) having the variable displacement mechanism (100) for changing the discharge capacity utilizing the pressure difference between the discharge pressure and the suction pressure has such an operating characteristic that even with a slight amount of increase in discharge pressure after activation, the discharge capacity smoothly increases subsequently and the normal refrigerant discharge function is performed.

In this aspect of the invention, the timing of ending the cooling mode for refrigerant recovery is accurately determined taking special note of the compressor operation characteristics described above. Specifically, the time begins to be counted from the time point when the discharge pressure rises by a predetermined amount after starting the compressor, and after the lapse of a predetermined time length, the cooling mode is ended. Thus, the cooling mode can be finished upon the lapse of a predetermined time length after confirming that the compressor (10) has begun to exhibit the refrigerant discharge function. According to this aspect of the invention, as in the first aspect of the invention, the cooling mode can be ended after confirming that the discharge pressure of the compressor (10) has actually increased into a state where the dormant refrigerant in the second heat exchanger (14) can be recovered. Before executing the heating mode with the hot gas heater cycle (H), therefore, the refrigerant can be positively recovered from the second heat exchanger (14) into the first heat exchanger (18). Thus, the same operational effects are thus exhibited as in the first aspect of the invention described above.

In this aspect of the invention, the compressor (10) is substantially suspended in operation in the case where the discharge pressure fails to rise by a predetermined amount within a predetermined time.

As long as the amount of the refrigerant sealed in the cycle remains insufficient due to the refrigerant leakage out of the cycle or the compressor (10) remains out of order, the amount of discharge pressure increase fails to reach a predetermined value within a predetermined time. In this aspect of the invention, therefore, the compressor (10) is automatically suspended in operation at the time of a malfunction thereby making it possible to protect the compressor (10) and other cycle parts.

The expression "the compressor (10) is substantially suspended in operation" is indicative of both the state that the compressor (10) is completely stopped by being separated from the drive source by clutch means and the state that the discharge capacity of the compressor (10) is maintained at minimum or about zero while continuing to drive the compressor rotary shaft by the drive source.

As an alternative method of executing this aspect of the invention, after ending the cooling mode for refrigerant recovery, the compressor (10) is turned to the off mode to suspend the operation thereof, and after the end of the compressor off mode, the heating mode with the hot gas heater cycle (H) is executed.

In this way, the refrigerant can be recovered from the second heat exchanger (14) to the first heat exchanger (18) by utilizing the difference between the second heat exchanger (14) and the first heat exchanger (18) even in compressor off mode.

According to this invention, the variable displacement type refrigerant compressor (10) may be a swash plate compressor (10) for changing, the discharge capacity by changing the piston stroke according to the inclination angle of the swash plate (10a), wherein the swash plate chamber (10b) accommodating the swash plate (10a) therein communicates with the discharge side and the suction side of the compressor (10) and the internal pressure of the swash plate chamber (10b) is controlled by the valve means (100) of the variable displacement mechanism thereby to change the inclination angle of the swash plate (10a).

As described above, the invention is suitably applicable to a refrigeration cycle system comprising a variable displacement type refrigerant compressor of swash plate type (10) in which the discharge capacity is changed by changing the inclination angle of the swash plate (10a).

The present invention may be more fully understood from the description of preferred embodiments of the invention, as set forth below, together with the accompanying drawings.

DESCRIPTION OF THE PREFERRED EMBODIMENTS

First Embodiment

Figure 1:
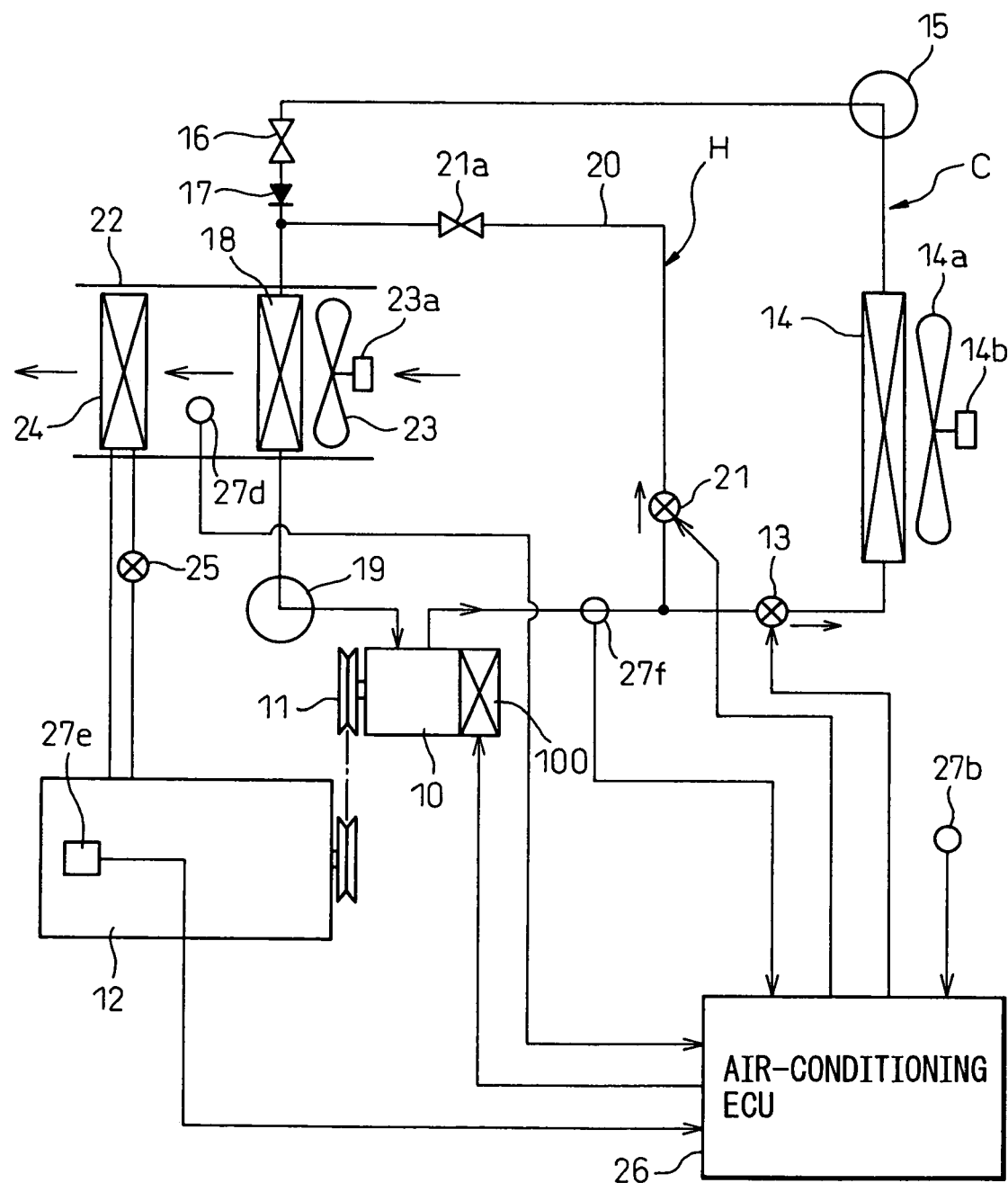
FIG. 1 is a diagram showing a cycle configuration of a refrigeration cycle system for automobiles according to a first embodiment of the invention.

FIG. 1 shows a refrigeration cycle system of an automotive air-conditioning system according to an embodiment of this invention. A compressor 10 is driven by a water-cooled vehicle engine 12 through a pulley 11. The compressor 10 is a variable displacement type refrigerant compressor of swash plate type and has a variable displacement mechanism for changing the discharge capacity utilizing the pressure difference between the discharge pressure and the suction pressure. This variable displacement mechanism is configured of an electromagnetic pressure control valve 100 or the like. An outline of the compressor 10 including the variable displacement mechanism (pressure control valve 100) is explained with reference to FIG. 2.

The discharge side of the compressor 10 is connected to a condenser 14 through a cooling solenoid valve 13, and the outlet side of the condenser 14 is connected to a liquid tank 15 for separating the refrigerant into gas and liquid and storing the liquid refrigerant. The condenser 14 is a second heat exchanger arranged in the vehicle engine compartment together with the compressor 10 for exchanging heat with the external air (cooling air) blown by a power-driven cooling fan 14a.

The outlet side of the liquid tank 15 is connected to a temperature-type expansion valve 16 constituting a cooling pressure-reduction unit. The outlet side of the temperature-type expansion valve 16 is connected to the inlet of an evaporator (first heat exchanger) 18 through a check valve 17. The outlet side of the evaporator 18 is connected to the intake side of the compressor 10 through an accumulator 19.

A normal cooling refrigeration cycle C is configured by a closed circuit including, from the discharge side of the compressor 10, the cooling solenoid valve 13, the condenser 14, the liquid tank 15, the temperature-type expansion valve 16, the check valve 17, the evaporator 18 and the accumulator 19 in that order, and returning back to the suction side of the compressor 10.

The valve opening degree (refrigerant flow rate) of the temperature-type expansion valve 16, as is well known, is adjusted in such a manner that the overheat degree of the outlet refrigerant of the evaporator 18 is maintained at a predetermined value during the normal refrigeration cycle operation (cooling mode). The accumulator 19 separates the refrigerant into gas and liquid and stores the liquid refrigerant, so that a small amount of liquid refrigerant (with oil contained therein) in the neighborhood of the bottom portion and the gas refrigerant are introduced into the compressor 10.

A hot gas bypass 20 for bypassing the condenser 14 or the like is formed between the discharge side of the compressor 10 and the inlet side of the evaporator 18. A reduction means 21a constituting a heating pressure-reduction unit and a heating solenoid valve 21 are arranged in series in the bypass 20. The restriction means 21a may be configured of a fixed restriction valve such as an orifice, a capillary tube or the like. As a result, the restriction means 21a may alternatively be formed integrally with the refrigerant path of the heating solenoid valve 21.

A heating hot gas heater cycle H is configured of a closed circuit including, from the discharge side of the compressor 10, the heating solenoid valve 21, the restriction means 21a, the evaporator 18 and the accumulator 19 in that order, and returning to the suction side of the compressor 10.

The air-conditioning case 22 of the vehicle air-conditioning system constitutes a path of the air flowing toward the passenger compartment, and a power-driven air-conditioning blower 23 is arranged in the air-conditioning case 22. An internal/external air switching box (not shown) is arranged at the intake side of the blower 23, so that the external air (air outside the passenger compartment) and the internal air (air inside the passenger compartment) are introduced by being switched from the internal/external air switching box. The air introduced into the internal/external air switching box is blown into the air-conditioning case 22 by the operation of the air-conditioning blower 23.

The evaporator 18 is a first heat exchanger arranged in the air-conditioning case 22. In a cooling mode, the refrigerant is circulated by the cooling refrigeration cycle C and the air blown by the air-conditioning blower 23 is cooled by the refrigerant evaporation (heat absorption) in the evaporator 18. In heating mode, on the other hand, a high-temperature refrigerant gas (hot gas) from the hot gas bypass 20 flows into the evaporator 18 and radiates heat into the air, and therefore the evaporator 18 functions as a heat radiator.

In the air-conditioning case 22, a heating heat exchanger 24 of hot water type for heating the blown air with the hot water (engine cooling water) from the vehicle engine 12 as a heat source is arranged in the air downstream of the evaporator 18. The air-conditioning air is blown into the passenger compartment from an air outlet (not shown) arranged downstream of the heating heat exchanger 24. A hot water valve 25 for controlling the hot water flow is arranged in the hot water circuit leading to the heating heat exchanger 24.

The air-conditioning control unit (hereinafter referred to as the ECU) 26, which is configured of a microcomputer and peripheral circuits, executes the arithmetic operation in accordance with a predetermined program thereby to control the open/close operation of the cooling and heating solenoid valves 13, 21 and the operation of other electrical devices (100, 14a, 23, 25, etc.).

Figure 2:
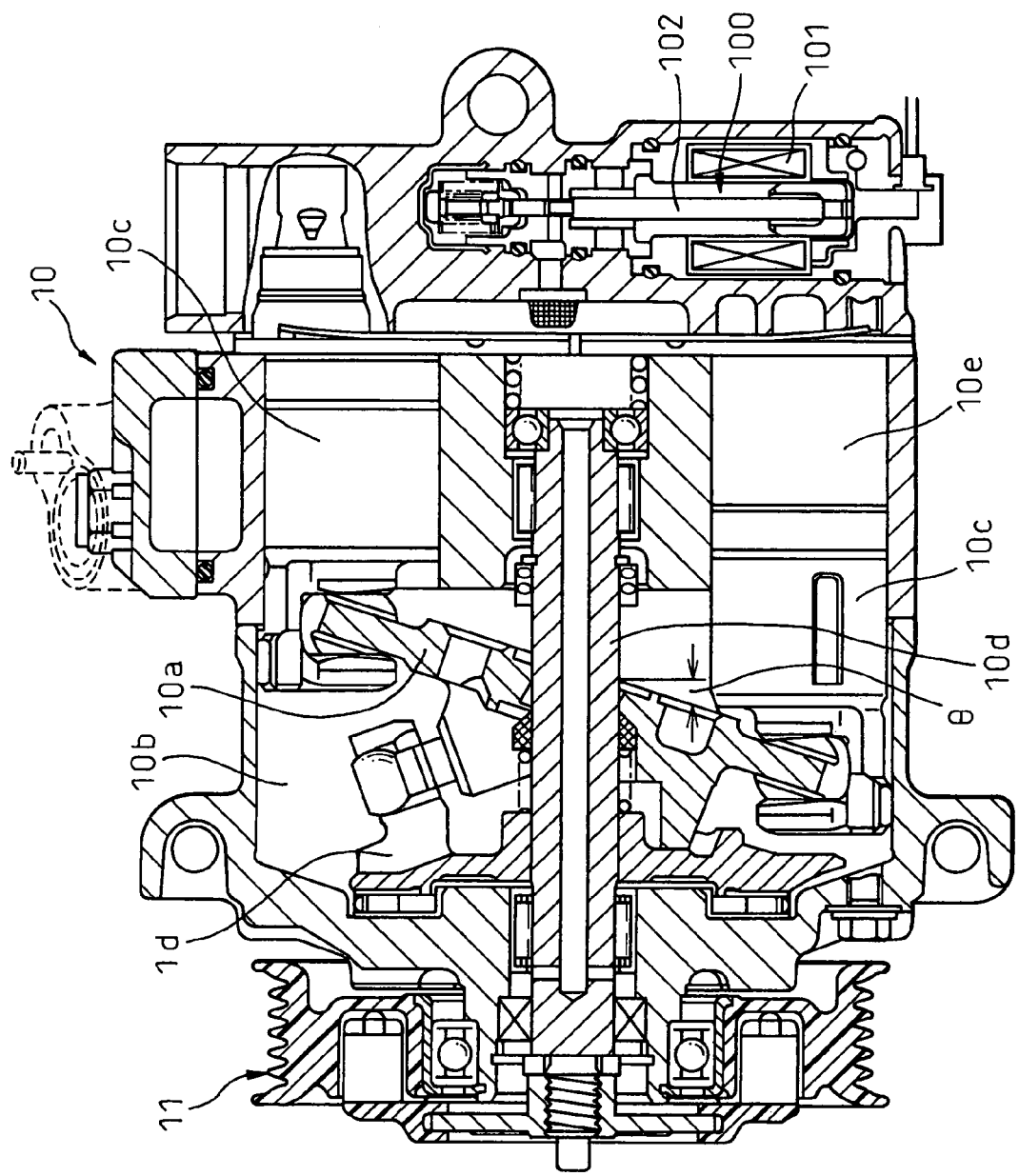
FIG. 2 is a sectional view illustrating the configuration of a compressor according to the first embodiment of the invention.

FIG. 2 is a sectional view showing a specific example of the variable displacement type refrigerant compressor 10 of swash plate type. In the compressor 10, as well known, the inclination angle θ of a swash plate 10a is changed by controlling the internal pressure of a swash plate chamber (crank case) 10b forming a control pressure chamber. In this way, the stroke of the piston 10c is changed thereby to change the discharge capacity.

Specifically, in the variable displacement type refrigerant compressor of swash plate type 10, the pressure of the swash plate chamber 10b is controlled so that the balance between the internal pressure of the swash plate chamber 10b acting on the piston 10c and the compressive reaction acting on the piston 10c is changed thereby to change the tilting moment for inclining the swash plate 10a, which in turn changes the inclination angle θ of the swash plate 10a thereby to change the stroke of the piston 10c and hence the discharge capacity.

The discharge capacity as it is referred to herein is defined as a theoretical discharge amount from the cylinder 10e per rotation of the rotary shaft 10d of the compressor 10.

More specifically, the swash plate chamber 10b is kept in communication with the suction side of the compressor 10 through a communication path, and a restriction means (not shown) such as an orifice or a capillary tube for generating a predetermined pressure loss is arranged in this suction-side communication path. The swash plate chamber 10b is also adapted to communicate with the discharge side of the compressor 10 through a pressure lead path (not shown), in which a pressure control valve 100 is arranged for variably controlling the area of the pressure lead path (not shown).

This pressure control valve 100 reduces the internal pressure (control pressure) of the swash plate chamber 10b by restricting or closing the pressure lead path to increase the discharge capacity. In this way, the inclination angle θ of the swash plate 10a is increased to increase the stroke of the piston 10c.

For reducing the discharge capacity, on the contrary, the pressure control valve 100 is opened so that the amount of the discharge refrigerant flowing into the swash plate 10b is increased thereby to increase the internal pressure (control pressure) of the swash plate chamber 10b. In this way, the inclination angle θ of the swash plate 10a is reduced thereby to reduce the stroke of the piston 10c. Therefore, when the discharge capacity is maximum, the internal pressure of the swash plate chamber 10b is substantially equal to the suction pressure. When the discharge capacity is minimum, on the other hand, the internal pressure of the swash plate chamber 10b is substantially equal to the discharge pressure.

The pressure control valve 100 is controlled by the ECU 26 as shown in FIG. 1. The ECU 26 controls the duty factor of the energization current of the magnetic coil 101 of the pressure control valve 100 in such a manner as to achieve a target level of the refrigerant evaporation pressure in the evaporator 5 during the normal operation of the compressor. The electromagnetic force of the magnetic coil 101 is changed by controlling the duty factor of the energization current of the magnetic coil 101, so that the valve operating rod 102 is displaced along the axial direction thereby to variably control the area of the pressure lead path.

The internal refrigerant evaporation pressure of the evaporator 18 has a correlationship with the refrigerant evaporation temperature. Further, the refrigerant evaporation temperature and the evaporator outlet air temperature are correlated with each other. According to this embodiment, the duty factor of the energization current of the pressure control valve 100 is controlled based on the air temperature immediately after passage through the evaporator 18, or specifically, the detection temperature of the temperature sensor 27d (FIG. 1). As an alternative, the energization current of the magnetic coil 101 may be changed analogically without controlling the duty factor thereof.

According to this embodiment, the turning effort of the vehicle engine 12 is kept transmitted to the rotary shaft 10d of the compressor 10 through the pulley 11. The rotary shaft 10d is thus kept in rotation while the vehicle engine 12 is running. The pulley 11 has a well-known torque limiter mechanism and a well-known torque variation absorbing damper mechanism. Also, unlike this embodiment in which the compressor 10 is so configured that the rotary shaft 10d is kept in rotation while the vehicle engine 12 is running, the compressor 10 may of course alternatively be operated intermittently through a well-known electromagnetic clutch interposed between the pulley 11 and the rotary shaft 10d.

Figure 3:
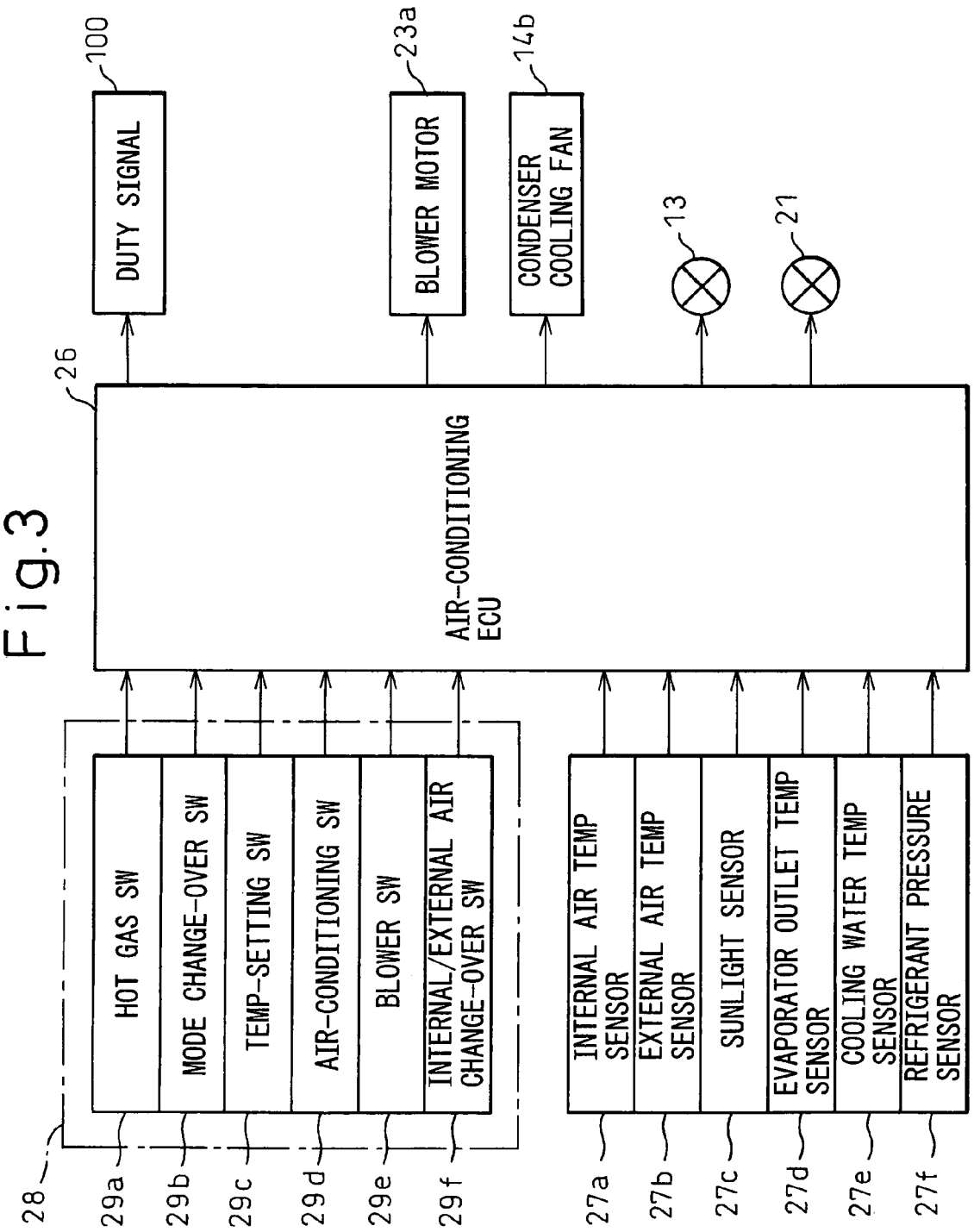
FIG. 3 is a block diagram showing an electrical control unit according to the first embodiment of the invention.

FIG. 3 is a block diagram showing an electrical control unit including an ECU 26 having sensors 27a to 27f to detect the air-conditioning environment factors required to automatically control the climate in the passenger compartment. The detection signals from these sensors are input to the ECU 26. These sensors specifically include an internal air temperature sensor 27a for detecting the air temperature in the passenger compartment (hereinafter referred to as the internal air temperature), an external air temperature sensor 27b, a sunlight sensor 27c for detecting the amount of sunlight incident to the passenger compartment, an evaporator outlet temperature sensor 27d for detecting the air temperature immediately after passage through the evaporator 18, a water temperature sensor 27e for detecting the temperature of the hot water (engine cooling water) flowing into the hot-water heat exchanger 24, and a refrigerant pressure sensor (high-pressure detection means) 27f for detecting the high pressure (discharge pressure Pd) of the refrigeration cycle.

Also, the switch operating signals from various operating switches 29a to 29f on the air-conditioning operation panel 28 arranged in the neighborhood of the instrument panel in the passenger compartment are input to the ECU 26. The operating switches specifically include a hot gas heating switch 29a for setting the heating mode with the hot gas heater cycle, an outlet mode changeover switch 29b for switching the air-conditioning air outlet mode, a temperature setting switch (temperature setting means) 29c for setting the passenger compartment temperature to the desired value, an air-conditioning switch 29d for giving an instruction to start or stop the compressor 10 of the refrigeration cycle, a blower switch 29e for giving an instruction to turn on/off the blower 23 and to change the air capacity, and an internal/external air changeover switch 29f for giving an instruction to switch the external air lead mode and the internal air circulation mode through the internal/external air switching box.

The air-conditioning switch 29d has the function of a cooling switch for setting the cooling mode. When the air-conditioning switch 29d is turned on, an output based on a predetermined starting duty factor is applied from the ECU 26 to the magnetic coil 101 of the pressure control valve 100 thereby to start the compressor 10.

Also, when the air-conditioning switch 29d is in an off state, the output based on the duty factor applied from the ECU 26 to the magnetic coil 101 of the pressure control valve 100 is set to zero and, by thus minimizing the discharge capacity of the compressor 10 to about zero, the compressor 10 is substantially suspended in operation.

Even when the hot gas heating switch 29a is turned on, the compressor 10 is started by applying a predetermined starting output based on the duty factor to the magnetic coil 101 of the pressure control valve 100 from the ECU 26.

In FIG. 3, reference numeral 14b designates a drive motor for the condenser cooling fan 14a, and numeral 23a a drive blower motor for the air-conditioning blower 23.

Next, the operation of the first embodiment having the configuration described above is explained. First, the operation of the refrigeration cycle portion is explained. When the air-conditioning switch 29d is turned on and set to the cooling mode, a predetermined output based on the duty factor is applied from the ECU 26 to the magnetic coil 101 of the pressure control valve 100, so that the compressor 10 operates at a predetermined discharge capacity corresponding to the output based on the duty factor.

In cooling mode, the cooling solenoid valve 13 is opened by the ECU 26, and the heating solenoid valve 21 is closed. The discharge gas refrigerant of the compressor 10 thus flows into the condenser 14 through the cooling solenoid valve 13 in open state.

In the condenser 14, the refrigerant is cooled and condensed by the external air blown from the cooling fan 14a. The refrigerant that has passed through the condenser 14 is separated into gas and liquid phases in the liquid tank 15, so that only the liquid refrigerant is reduced in pressure by the temperature-type expansion valve 16 into two phases, gas and liquid, low in temperature and pressure.

Next, the low-pressure refrigerant flows into the evaporator 18 through the check valve 17, and evaporates by absorbing heat from the air-conditioning air blown from the fan 23. The air-conditioning air that has been cooled in the evaporator 18 is blown into and cools the compartment. The gas refrigerant that has evaporated in the evaporator 18, on the other hand, is introduced and compressed in the compressor 10 through the accumulator 19.

During the winter season, the hot gas heating switch 29a is turned on to set the heating mode with the hot gas heater cycle. In this case, the compressor 10 is activated with a discharge capacity corresponding to an output based on a predetermined duty factor of the ECU 26. In heating mode, the cooling solenoid valve 13 is closed by the ECU 26, while the heating solenoid valve 21 is opened thereby to open the hot gas bypass 20. As a result, the high-temperature discharge gas refrigerant (overheated gas refrigerant) of the compressor 10 is reduced in pressure in the restriction means 21a through the heating solenoid valve 21 in open state, and then directly flows into the evaporator 18.

In the process, the check valve 17 prevents the gas refrigerant from the hot gas bypass 20 from flowing into the condenser 14 through the temperature-type expansion valve 16. Thus, the refrigeration cycle is operated in a closed circuit (hot gas heater cycle H), starting from the discharge side of the compressor 10, including the heating solenoid valve 21, the restriction means 21a, the evaporator 18, the accumulator 19 and the compressor 10 in that order, finally returning to the suction side of the compressor 10.

The overheated gas refrigerant reduced in pressure by the restriction means 21a radiates heat into the blown air in the evaporator 18 thereby to heat the blown air. The heat released from the gas refrigerant in the evaporator 18 corresponds to the amount of compression work conducted by the compressor 10. At the same time, the hot water of the engine 12 is supplied through a hot water valve 25 to the hot-water heating heat exchanger 24 to further heat the blown air in the heat exchanger 24.

As a result, even during the very cold season, a hot air comparatively high in temperature can be blown into the passenger compartment for an improved in-compartment heating effect. The gas refrigerant that has radiated heat in the evaporator 18 is introduced and compressed again in the compressor 10 through the accumulator 19.

When the water of the engine 12 is low in temperature, the low-temperature air can be prevented from being blown into the passenger compartment by executing the warm-up control process for suspending the operation of the blower 23 even in the case where the compressor 10 is activated.

Figure 4:
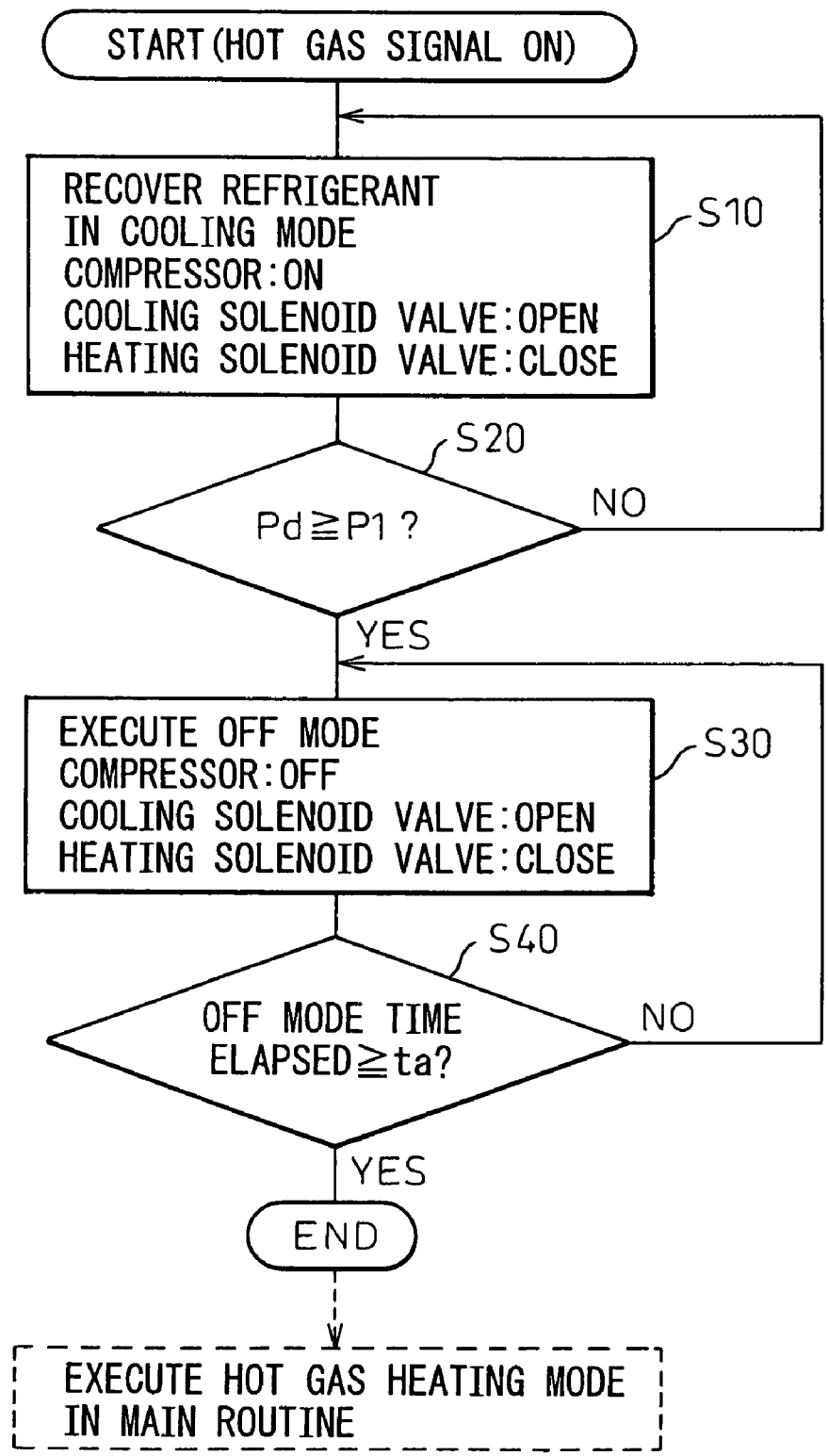
FIG. 4 is a flowchart showing the refrigerant recovery control operation according to the first embodiment of the invention.

Next, the operation of controlling the dormant refrigerant recovery mode constituting the feature of the first embodiment of the invention is explained with reference to the flowchart of FIG. 4. FIG. 4 shows a subroutine for the dormant refrigerant recovery mode started by a turn-on signal of the hot gas heating switch 29a for the main routine of the air-conditioning control operation executed by the ECU 26.

First, in step S10, the dormant refrigerant is recovered in cooling mode by turning on the hot gas heating switch 29a. In step S10, the compressor 10 is activated to a predetermined discharge capacity corresponding to an output based on a predetermined duty factor assigned to the pressure control valve 100. At the same time, the cooling solenoid valve 13 is opened while the heating solenoid valve 21 is closed.

As a result, the gas refrigerant discharged from the compressor 10 flows into the condenser 14 through the cooling solenoid valve 13 in open state, and circulates through the cooling refrigeration cycle C. In step S20, it is determined whether the discharge pressure Pd of the compressor 10 has risen beyond a predetermined setting P1 or not. As long as the discharge pressure Pd is lower than the setting P1, the process of recovering the dormant refrigerant in cooling mode is continued in step S10.

The setting P1 is predetermined at a pressure substantially equal to such a level that the refrigerant in the condenser 14 can be returned to the evaporator 18 by the pressure difference between the condenser 14 and the evaporator 18 during the execution in compressor off mode in step S30.

The fact that the discharge pressure Pd of the compressor 10 has risen above the predetermined setting P1 during the dormant refrigerant recovery indicates that the inclination angle θ of the swash plate 10a of the compressor 10 has changed sufficiently upward and the discharge capacity of the compressor 10 has sufficiently increased to such an extent as to exhibit the normal refrigerant discharge function of the compressor 10.

In other words, the dormant refrigerant in the condenser 14 is pushed out to the evaporator 18 by the refrigerant discharge function of the compressor 10 to sufficiently exhibit the function of recovering the dormant refrigerant.

Once the discharge pressure Pd has risen to or above the predetermined setting P1, the process is executed with the compressor 10 in off mode in the next step S30. In executing the process with the compressor 10 in off mode, the output based on the duty factor applied to the pressure control valve 100 is reduced to zero thereby to minimize the discharge capacity of the compressor 10 to about zero. As a result, the operation of the compressor 10 is substantially suspended. Also, the open state of the cooling solenoid valve 13 and the closed state of the heating solenoid valve 21 are maintained even while the compressor 10 is in off mode.

In the compressor off mode immediately after switching from the dormant refrigerant recovery mode, the pressure difference is so maintained that the pressure of the condenser 14 is higher than that of the evaporator 18. Thus, the refrigerant continues to move from within the condenser 14 toward the evaporator 18. Even after switching to the compressor off mode, therefore, the dormant refrigerant continues to be recovered.

In step S40, it is determined whether the predetermined set time ta has passed after execution of the process with the compressor 20 in off mode. The set time ta is an experimentally determined time required before the pressure of the condenser 14 and the pressure of the evaporator 18 become equal to each other after execution of the process with the compressor 20 in the off mode.

At the time point when the determination in step S40 becomes YES, therefore, the pressure of the condenser 14 and the pressure of the evaporator 18 become equal to each other so that the refrigerant transfer from the condenser 14 to the evaporator 18 stops. Once the determination in step S40 turns YES, therefore, the compressor off mode is ended thereby to terminate the subroutine of FIG. 4.

Once the subroutine of FIG. 4 is complete, the main routine for controlling the air-conditioning operation executes the heating mode with the hot gas heater cycle H. Specifically, the compressor 10 is activated with a predetermined discharge capacity corresponding to an output based on the predetermined duty factor applied to the pressure control valve 100. At the same time, the cooling solenoid valve 13 is closed and the heating solenoid valve 21 opened. As a result, the refrigerant is circulated with the hot gas heater cycle H thereby to exhibit the hot gas heating function.

The heating mode with the hot gas heater cycle H is required during the very cold season when the external air temperature is as low as about −20° C. to −30° C. As described in the Related Art above, the variable displacement type refrigerant compressor of a swash plate type 10 develops a phenomenon in which it cannot be increased to a large discharge capacity rapidly due to the stagnation of the liquid refrigerant in the swash plate chamber 10b or the reduced concentration of the suction refrigerant.

According to this embodiment, on the other hand, the compressor 10 continues to be operated in cooling mode for recovery of the dormant refrigerant while the discharge pressure Pd is less than a predetermined setting P1. Only after the discharge pressure Pd has exceeded the setting P1, the dormant recovery operation in cooling mode is terminated. After confirming that the compressor 10 comes to exhibit the normal refrigerant discharge function with the rise in the discharge pressure Pd, therefore, the dormant refrigerant recovery in cooling mode can be terminated.

In this way, the dormant refrigerant in the condenser 14 can be pushed to the evaporator 18 by the refrigerant discharge function of the compressor 10, thus making it possible to satisfactorily recover the dormant refrigerant. Further, even while the compressor 10 is in off mode after termination of the dormant refrigerant recovery mode, the dormant refrigerant can continue to be recovered from the condenser 14 due to the difference between the internal pressure of the condenser 14 and the internal pressure of the evaporator 18.

Even with the refrigeration cycle system using the variable displacement type refrigerant compressor of swash plate type 10 for changing the discharge capacity utilizing the difference between discharge pressure and suction pressure, therefore, the dormant refrigerant can be recovered positively in the condenser 14.

In this way, the dormant refrigerant in the condenser 14 is positively recovered into the evaporator 18, so that the refrigerant shortage which otherwise might be caused in the heating mode with the hot gas heater cycle H is prevented. As a result, the compressor 10 can be operated with the originally proper refrigerant amount in heating mode with the hot gas heater cycle H. Also, the discharge pressure of the compressor 10 can be sufficiently increased for an improved hot gas heating performance. At the same time, the oil returnability to the compressor 10 is satisfactorily secured thereby contributing to a longer service life of the compressor 10.

According to this embodiment, it is determined in step S40 whether the predetermined set time ta has passed after execution of the process in off mode. Nevertheless, step S40 is intended to determine whether the pressure of the condenser 14 and the pressure of the evaporator 18 are balanced with each other or not after execution of the process in off mode. As an alternative, therefore, a pressure sensor for detecting the pressure of the condenser 14 and a pressure sensor for detecting the pressure of the evaporator 18 are arranged and, based on the detection outputs of the two pressure sensors, the state is detected where the pressure of the condenser 14 and the pressure of the evaporator 18 are balanced with each other thereby to terminate the process in off mode.

Second Embodiment

In the first embodiment, after starting the operation of dormant refrigerant recovery in cooling mode, it is determined that the discharge pressure Pd has exceeded the predetermined setting P1, and the dormant refrigerant recovery in cooling mode is terminated. According to the second embodiment, in contrast, the timing of ending the dormant refrigerant recovery in cooling mode is determined separately.

Figure 5:
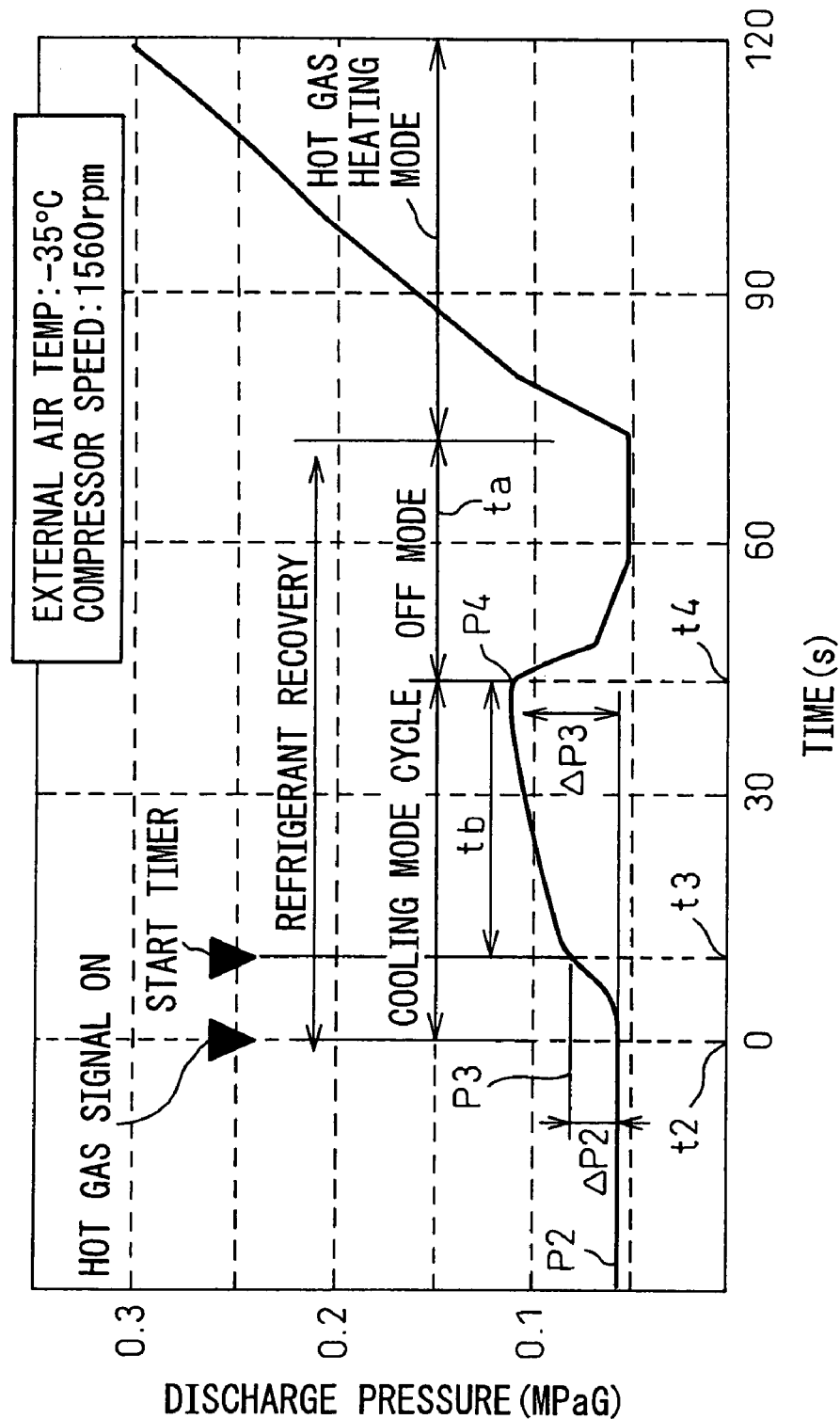
FIG. 5 is a diagram for explaining the discharge pressure behavior in the refrigerant recovery control operation according to a second embodiment of the invention.

FIG. 5 is a graph showing the concept of controlling the dormant refrigerant recovery mode according to the second embodiment. In FIG. 5, the abscissa represents the time elapsed after the hot gas heating switch 29a is turned on to turn on the hot gas signal, and the ordinate the discharge pressure (MPaG, gauge pressure) of the compressor 10. FIG.

5 thus shows that the discharge pressure behavior after the hot gas signal turns on and the compressor 10 is started.

FIG. 5 shows the discharge pressure behavior in the case where HFC 134a is used as a refrigerant at the external air temperature of −35° C. with the compressor rotational speed of 1560 rpm. The discharge pressure P2 before starting the compressor 10 is a refrigerant saturated pressure determined by the external air temperature.

In the variable displacement type refrigerant compressor of swash plate type 10, once the inclination angle θ of the swash plate 10a changes upward after the compressor starts so that the piston 10c discharges the refrigerant slightly, the discharge capacity begins to rise smoothly and exhibits the normal refrigerant discharge function. According to the second embodiment, taking special note of this operating characteristic of the compressor, the timing at which the dormant refrigerant recovery in cooling mode is terminated is accurately determined.

Specifically, the timer is started at a time point t3 when the discharge pressure rises by a predetermined amount ΔP2 from the discharge pressure (refrigerant saturation pressure before starting the compressor) P2 at a time point t2 when the turn-on signal of the hot gas heating switch 29a is produced. At a time point t4 when the count of the timer reaches a predetermined set time tb, the operation in cooling mode is ended.

The set time tb is determined as a time required for the discharge pressure to rise to P4 at which the refrigerant in the condenser 14 can be returned substantially to the evaporator 18 due to the pressure difference between the condenser 14 and the evaporator 18 in the next compressor off mode.

As in the first embodiment, the compressor is maintained in the off mode for a predetermined set time ta after the lapse of the set time tb, after which the heating mode with the hot gas heater cycle H is executed.

Figure 6:
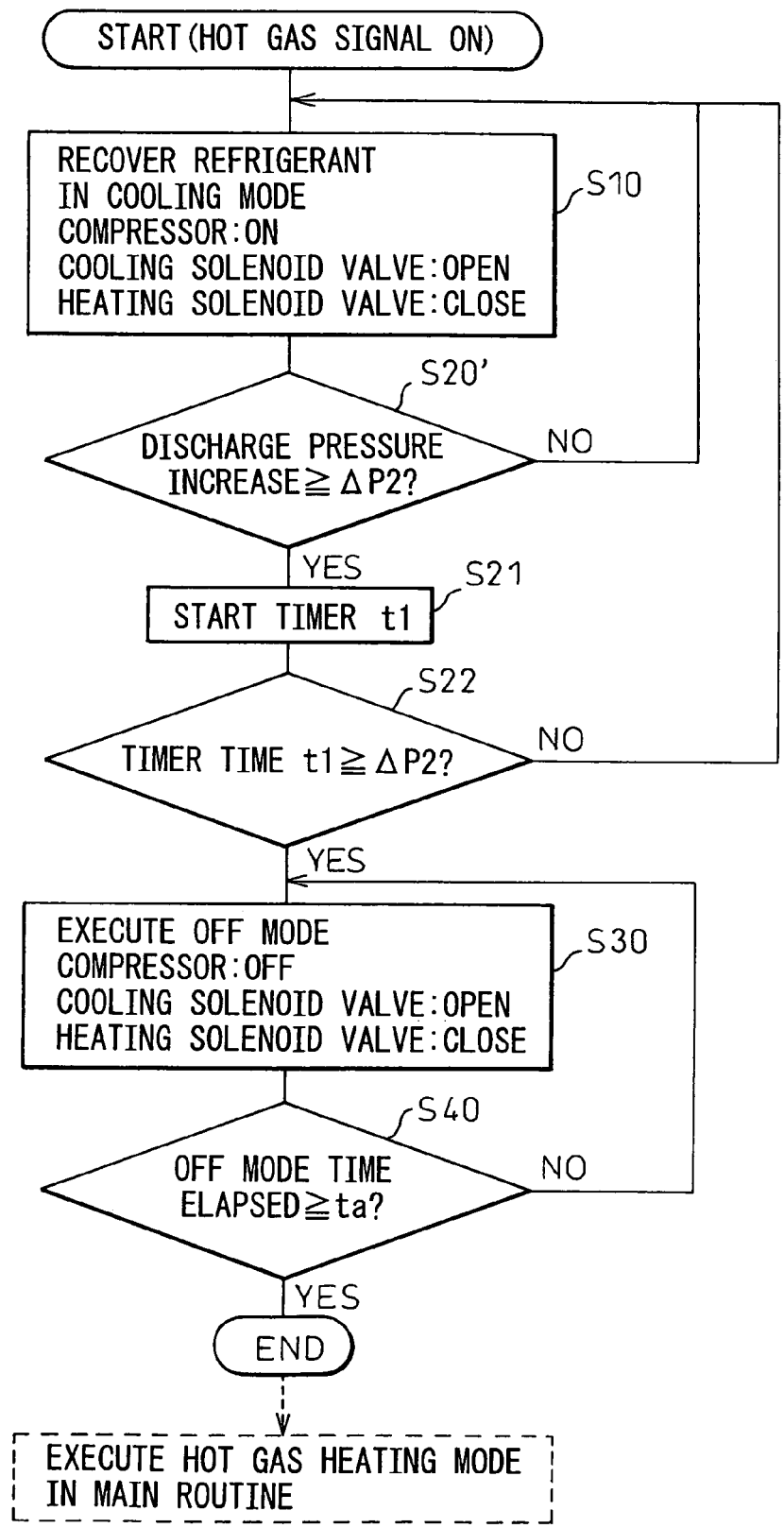
FIG. 6 is a flowchart showing the refrigerant recovery control operation according to the second embodiment of the invention.

FIG. 6 is a control flowchart based on the concept described above. The difference of FIG. 6 from FIG. 4 resides in that it is determined in step S20' whether the discharge pressure has increased by at least a predetermined amount ΔP2 in starting the dormant refrigerant recovery in cooling mode, and in the case where the discharge pressure increase is less than the predetermined amount ΔP2, the dormant refrigerant recovery mode is executed in step S10.

Once the discharge pressure has increased by the predetermined amount ΔP2 or more, the timer is started in step S21, and it is determined in step S22 whether the timer count has increased to the set time tb or more. In the case where the timer count is less than the set time tb, the dormant refrigerant recovery mode in step S10 is continued. Once the timer count t1 has increased to the set time tb or more, the process proceeds to step S30, where the dormant refrigerant recovery mode is terminated and the process is executed in compressor off mode.

According to the second embodiment, it can be confirmed that the refrigerant discharge function of the variable displacement type refrigerant compressor of swash plate type 10 has substantially started, by determining in step S20' that the discharge pressure has increased by the predetermined amount ΔP2 or more after starting the cooling mode. After that, the timer is started, and the timing of ending the cooling mode operation (the dormant refrigerant recovery in cooling mode) is determined by the count on the timer. Thus, the compressor operation in cooling mode can be stopped at a time point when the discharge pressure has risen to at least the level required for recovery of the dormant refrigerant.

Also according to the second embodiment, therefore, the dormant refrigerant can be recovered properly as in the first embodiment.

Third Embodiment

Figure 7:
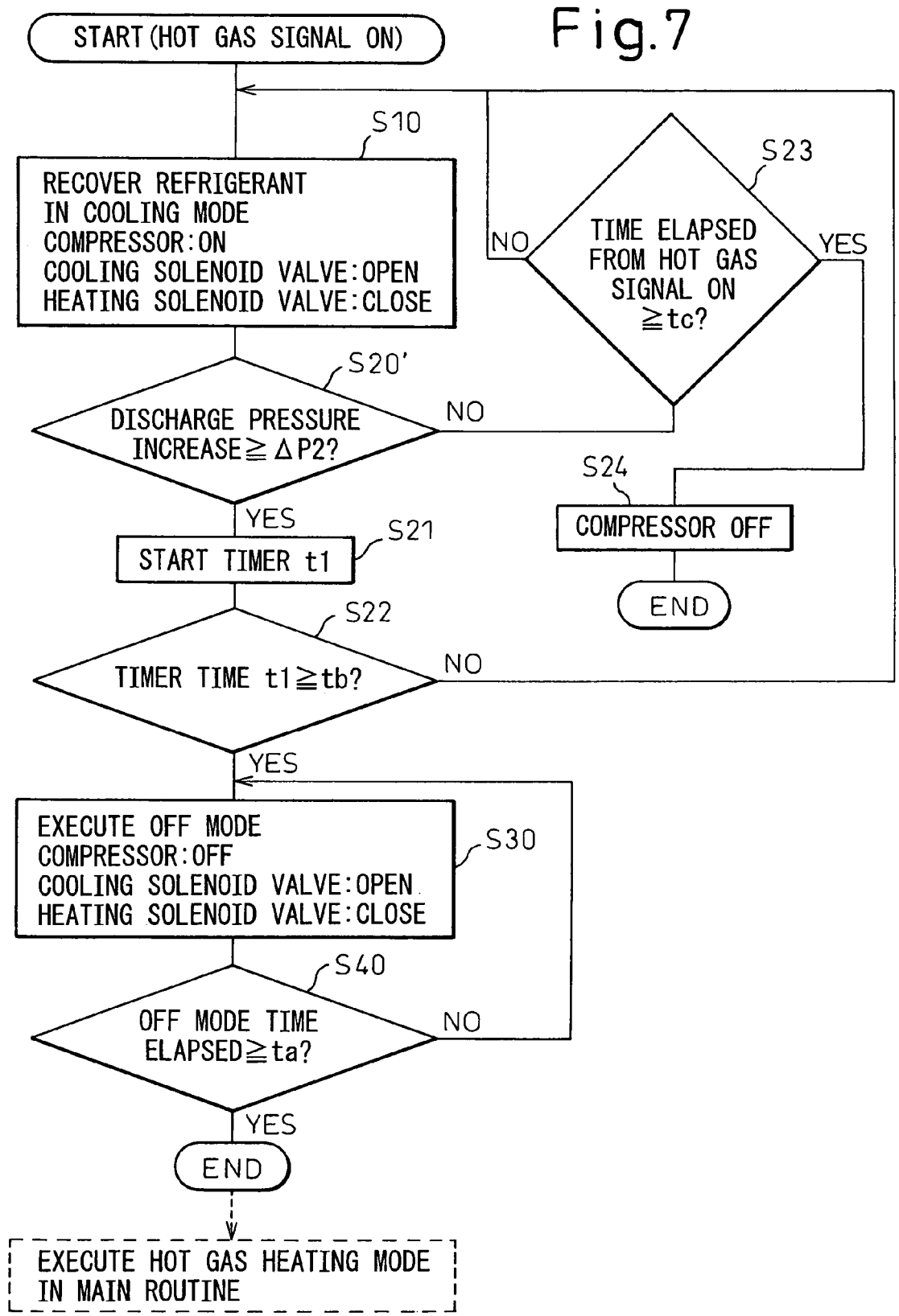
FIG. 7 is a flowchart showing the refrigerant recovery control operation according to a third embodiment of the invention.

In the third embodiment, the function protective against a malfunction is added to the second embodiment. FIG. 7 shows the third embodiment in which steps S23 and S24 are added to the embodiment shown in FIG. 6.

In step S23, it is determined whether a predetermined time tc has passed from the time point (cooling mode starting point) t2 at which a turn-on signal of the hot gas heating switch 29a is produced. As long as the refrigeration cycle is normal, the discharge pressure rises by at least a predetermined amount ΔP2 after starting the cooling mode before the lapse of the predetermined time tc from the cooling mode starting time point t2. As a result, the process proceeds from step S20' to step S21 while the result of determination in step S23 remains NO.

At the time of a malfunction when the compressor 10 is out of order or the amount of the refrigerant sealed in the cycle is in short supply due to the refrigerant leakage outside the cycle, however, the discharge pressure fails to rise by more than the predetermined amount ΔP2 even after the lapse of the predetermined time tc from the cooling mode starting time point t2.

In such a case, therefore, the result of determination in step S23 is YES, so that in step S24, the output based on the duty factor applied to the pressure control valve 100 is reduced to zero thereby to minimize the discharge capacity of the compressor 10 to almost zero and thus to substantially stop the compressor 10. As a result, the compressor 10 and other cycle parts can be protected.

Fourth Embodiment

Figure 8:
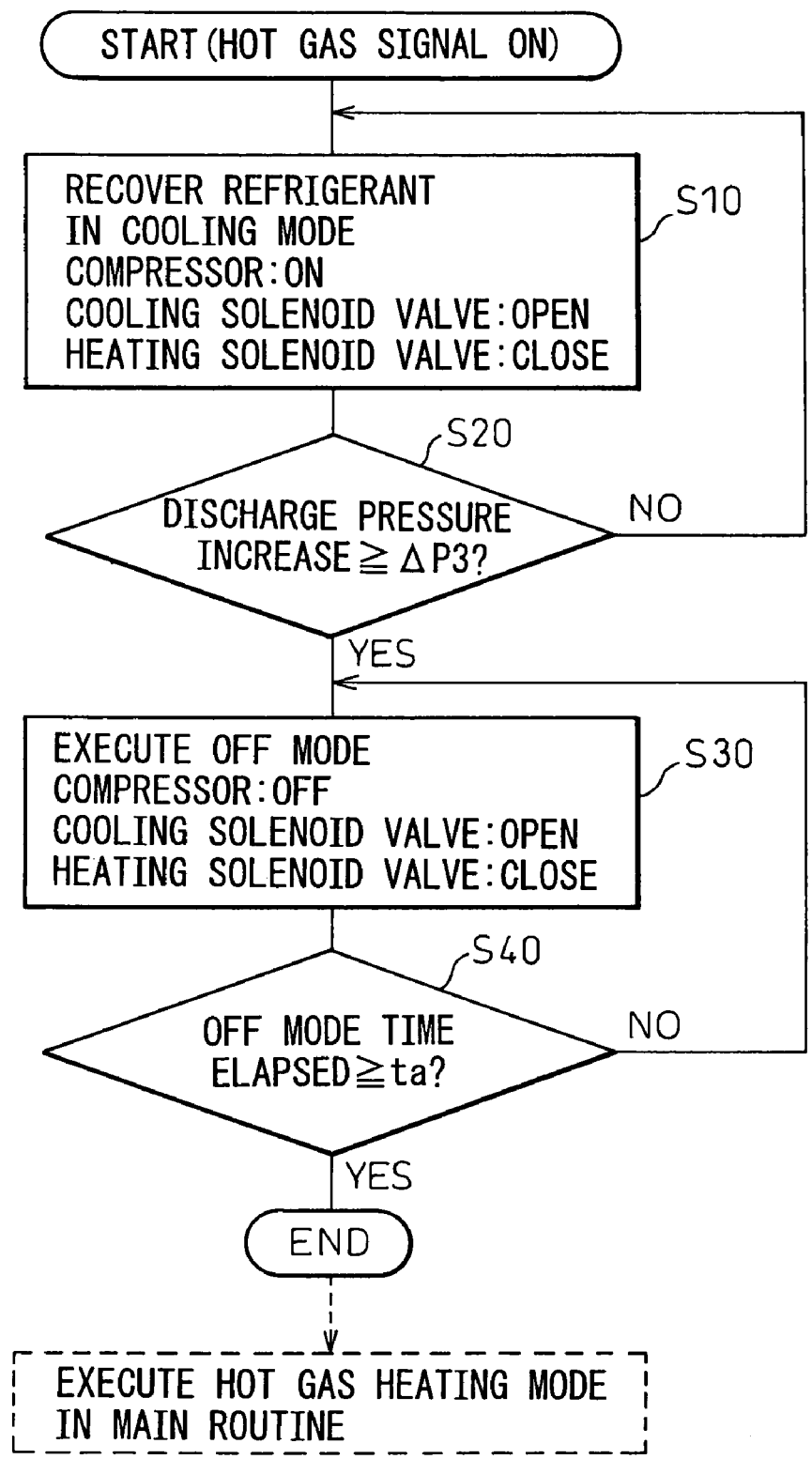
FIG. 8 is a flowchart showing the refrigerant recovery control operation according to a fourth embodiment of the invention.

The fourth embodiment is a modification of the first embodiment. According to the first embodiment, it is determined in step S20 whether the discharge pressure Pd of the compressor 10 has increased to at least a predetermined setting P1, and once the discharge pressure Pd increases to at least the predetermined setting P1, the recovery of the dormant refrigerant in cooling mode is terminated. In the fourth embodiment, in contrast, as shown in FIG. 8, it is determined in step S20' whether the discharge pressure has increased by at least a setting ΔP3 (FIG. 5) after starting the cooling mode, and once the discharge pressure has increased by an amount equal to at least the setting ΔP3 (FIG. 5), the process proceeds to step S30, so that the recovery of the dormant refrigerant in cooling mode is terminated and the process is executed with the compressor in off mode.

As in the fourth embodiment, the operational effects similar to those of the first embodiment can be exhibited by determining the timing of terminating the cooling mode operation based on the amount by which the discharge pressure increases after starting the cooling mode.

In all the embodiments described above, the discharge pressure is monitored and the cooling mode is determined. Nevertheless, a similar effect can be achieved also by monitoring the discharge temperature correlated with the discharge pressure. In other words, the object of this invention can be achieved also by controlling the operation in such a manner as to end the cooling mode when the temperature on a temperature sensor arranged at the discharge portion reaches a predetermined value.

Incidentally, in the cooling refrigeration cycle C, the high-pressure side pressure from the discharge side of the compressor 10 to the upstream portion of the pressure restriction mechanism 16 is closely correlated with the discharge pressure Pd of the compressor 10, and therefore according to this invention, the discharge pressure Pd is meant to include the high-pressure side pressure.

While the invention has been described by reference to specific embodiments chosen for purposes of illustration, it should be apparent that numerous modifications could be made thereto by those skilled in the art without departing from the basic concept and scope of the invention.

The invention claimed is:

1. A refrigeration cycle system comprising means for switching between:
   a cooling mode in which a refrigerant discharged from a compressor is returned to said compressor through a second heat exchanger, a cooling pressure reduction unit and a first heat exchanger thereby to operate said first heat exchanger as an evaporator; and
   a heating mode with a hot gas heater cycle (H) in which the refrigerant discharged from said compressor bypasses said second heat exchanger and is returned through said first heat exchanger to said compressor thereby to operate said first heat exchanger as a heat radiator;
   wherein upon generation of a start signal for said hot gas heater cycle (H), said cooling mode is started first thereby to start the recovery of the refrigerant dormant in said second heat exchanger, and after execution of said dormant refrigerant recovery, said heating mode with said hot gas heater cycle (H) is executed;
   wherein said compressor is a variable displacement type refrigerant compressor having a variable displacement mechanism for changing the discharge capacity utilizing the difference between the discharge pressure and the suction pressure; and
   wherein after starting the dormant refrigerant recovery in said cooling mode, the timing of ending said cooling mode is determined based on an information value correlated with the discharge pressure of said compressor.

2. A refrigeration cycle system according to claim 1, wherein said cooling mode is terminated when the discharge pressure of said compressor increases to a predetermined value.

3. A refrigeration cycle system according to claim 1, wherein said cooling mode is terminated when the discharge pressure of said compressor after starting said cooling mode increases by at least a predetermined amount.

4. A refrigeration cycle system according to claim 1, wherein the operation of said compressor is substantially suspended in the case where said discharge pressure fails to increase by said predetermined amount within a predetermined length of time.

5. A refrigeration cycle system according to claim 1, wherein after said cooling mode is terminated, the operation of said compressor is suspended in off mode, and wherein, after terminating said off mode, the heating mode with said hot gas heater cycle (H) is executed.

6. A refrigeration cycle system according to claim 1, wherein said variable displacement type refrigerant compressor is a compressor of swash plate type for changing the discharge capacity by changing the piston stroke according to the inclination angle of said swash plate, and
   wherein a swash plate chamber with said swash plate arranged therein communicates with the discharge side and the suction side of said compressor, and the internal pressure of said swash plate chamber is controlled by changing the inclination angle of said swash plate under the control of a valve means of said variable displacement mechanism.

7. A refrigeration cycle system comprising means for switching between:
   a cooling mode in which a refrigerant discharged from a compressor is returned to said compressor through a second heat exchanger, a cooling pressure reduction unit and a first heat exchanger thereby to operate said first heat exchanger as an evaporator; and
   a heating mode with the hot gas heater cycle (H) in which the refrigerant discharged from said compressor bypasses said second heat exchanger and is returned through said first heat exchanger to said compressor thereby to operate said first heat exchanger as a heat radiator;
   wherein, upon generation of a start signal for said hot gas heater cycle, said cooling mode is started first thereby to start the recovery of the refrigerant dormant in said second heat exchanger and, after execution of said dormant refrigerant recovery, said heating mode with said hot gas heater cycle (H) is executed;
   wherein said compressor is a variable displacement type refrigerant compressor having a variable displacement mechanism for changing the discharge capacity utilizing the difference between the discharge pressure and the intake pressure; and
   wherein, when the discharge pressure of said compressor increases by a predetermined amount after starting the dormant refrigerant recovery in said cooling mode, said cooling mode is terminated upon lapse of a predetermined time after starting to count the time from said time point when said discharge pressure increases by said predetermined amount.

8. A refrigeration cycle system according to claim 7, wherein the operation of said compressor is substantially suspended in the case where the discharge pressure fails to increase by said predetermined amount within a predetermined length of time.

9. A refrigeration cycle system according to claim 7, wherein after said cooling mode is terminated, the operation of said compressor is suspended in off mode, and wherein after terminating said off mode, the heating mode with said hot gas heater cycle (H) is executed.

10. A refrigeration cycle system according to claim 7, wherein said variable displacement type refrigerant compressor is a compressor of swash plate type for changing the discharge capacity by changing the piston stroke according to the inclination angle of said swash plate, and
    wherein a swash plate chamber with said swash plate arranged therein communicates with the discharge side and the suction side of said compressor, and the internal pressure of said swash plate chamber is controlled by changing the inclination angle of said swash plate under the control of a valve means of said variable displacement mechanism.

* * * * *